United States Patent [19]

Hattori

[11] Patent Number: 4,536,954

[45] Date of Patent: Aug. 27, 1985

[54] COIL INSERTER

[75] Inventor: Takatoshi Hattori, Kasugai, Japan

[73] Assignee: Mitsubishi Denki Kabushiki Kaisha, Tokyo, Japan

[21] Appl. No.: 535,292

[22] Filed: Sep. 23, 1983

[30] Foreign Application Priority Data

Sep. 25, 1982 [JP] Japan .................. 57-167002
Nov. 15, 1982 [JP] Japan .................. 57-200142

[51] Int. Cl.³ .......................... H02K 15/06
[52] U.S. Cl. .......................... 29/736; 29/596
[58] Field of Search ........ 29/596, 732, 734, 736, 29/606

[56] References Cited

U.S. PATENT DOCUMENTS

| | | | |
|---|---|---|---|
| 4,024,632 | 5/1977 | Inglis | 29/736 |
| 4,047,293 | 9/1977 | Kieffer | 29/596 X |
| 4,156,964 | 6/1979 | Walker et al. | |
| 4,285,119 | 8/1981 | Habegger | 29/736 X |
| 4,400,871 | 8/1983 | Barerra | 29/736 X |
| 4,433,475 | 2/1984 | Kubota et al. | 29/736 |

FOREIGN PATENT DOCUMENTS

52852  6/1982  European Pat. Off. .

Primary Examiner—Carl E. Hall
Attorney, Agent, or Firm—Oblon, Fisher, Spivak, McClelland & Maier

[57] ABSTRACT

A method of inserting coils into the slots of a stator iron core by moving a pressing piece and a blade supporter which are formed as separate bodies comprises a step of holding said coils by first blades fixed to said pressing piece and second blades fixed to said blade supporter, a step of moving forward said pressing piece and said blade supporter together to insert said coils into the slots of said iron core by means of said first and second blades, and a step of moving backward only said blade supporter for a predetermined distance followed by causing said pressing piece to move backward together with said blade supporter whereby said second blades are firstly retracted while keeping said first blades momentarily at a position.

3 Claims, 10 Drawing Figures

COIL INSERTER

BACKGROUND OF THE INVENTION

The present invention relates to a coil inserter for fabricating a stator by inserting coils into the stator iron core of a rotary electric machine. More particularly, it relates to a coil inserter having an upper tool which permits insertion of coils without causing damage to the coils and which provides stable positional relationship between the iron core and the coils with wedges.

Description of the Prior Art

Figure 1:
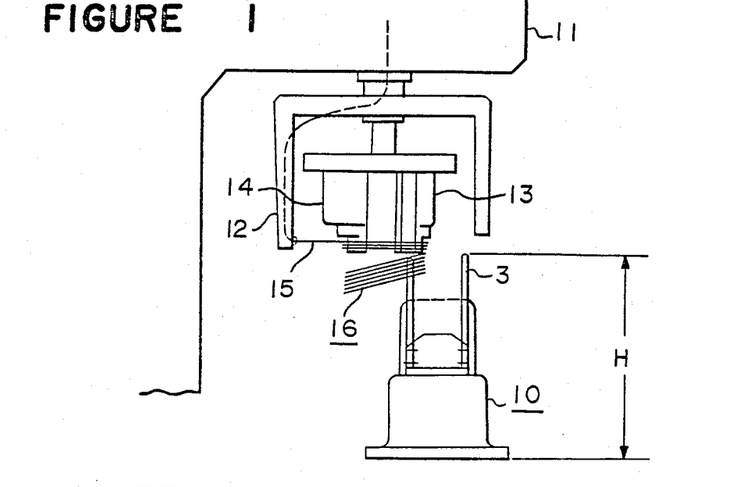
FIG. 1 is a front view of a typical winding and falling machine.

There has so far been known a winding and falling system as shown in FIG. 1 as an expedient for directly winding coils on an upper tool 10 of a coil inserter, the coils being inserted into an iron core by the coil inserter. The winding and falling system is constructed in such a manner that a front winding frame 13 and a rear winding frame 14 are suspended from a winding head 11 and a wire guide 12 is rotated by a driving part in the winding head 11 around the front and rear frames, while a wire 15 is drawn out from the wire guide 12 to thereby form wire loops as coils. The coils 16 wound on the front winding frame 13 are forced off the front winding frame 13 and fall onto the upper tool 10 of the coil inserter in which a number of blades 3 are arranged in a circular form and extends upwardly, the coils 16 being distributed into predetermined spaces formed between the adjacent blades 13. For uniformly distributing coils 16 for one or plural phases, it is necessary to carry out proper allotment to the upper tool 10 and to make the top of the blades 3 substantially even, which constitutes the upper part of the upper tool 10 (there is a variety of thickness in iron cores).

Figure 2:
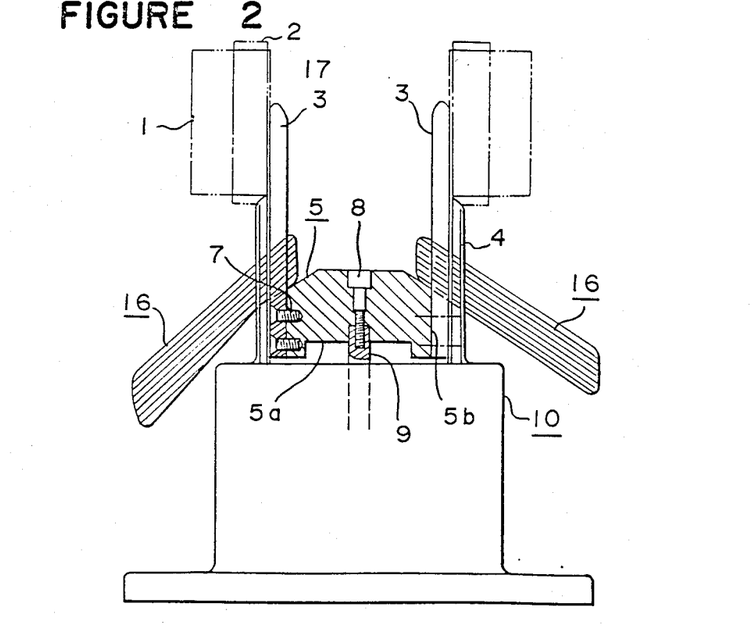
FIG. 2 is a front view, partly in cross-section, of a upper tool of the conventional coil inserter.

As an upper tool 10 of a coil inserter to satisfy the requirement described above, there has been known one as shown in FIG. 2. In FIG. 2, the reference numeral 10 designates an upper tool of a coil inserter on which a pressing piece 5 having a generally cylindrical shape is placed. The pressing piece 5 is connected at its lower surface 5a by a bolt 8 to an operating rod 9 which extends into the upper tool 10 so as to be movable in the vertical direction by a driving means housed in the upper tool. A number of blades 3, the number being such as twenty-four, which corresponds to the number of slots 17 formed in the inner wall of the stator iron core 1, are fixed at their lower ends to grooves 5b formed on the outer peripheral surface of the pressing piece 5 by means of small screws 7 so that the upper ends of the blades 3 are provided in circular array corresponding to the circular array of stator teeth formed between the stator slots 17. The coils 16 are put between the spaces formed by adjacent paired blades which are selected in accordance with a predetermined coil insertion pattern. The blades 3 are so arranged that the respective top ends are in alignment with respective stator teeth when the stator is put onto the blades, and the coils 16 are inserted into the slots by the action of the blades 3 when the pressing piece 5 holding the blades 3 is raised by the operating rod 9. Each wedge guide 4 is attached to the outer side of each of the blades 3 to determine the lowest position of the stator iron core 1 at the extreme end and to guide a wedge (not shown) to be inserted at the same time of the insertion of the coils 16. The reference numeral 2 designates an insulating paper which is put in each of the stator slots 17.

The operation of the conventional apparatus will be described. As shown in FIG. 1, the coils 16 are first set between the blades 3. The stator iron core 1 is then fitted to the upper tool 10 so that the inner diameter of the iron core is in contact with the outer peripheries of the blades 3. Next, a stopper (not shown) is fitted to the outer periphery of the upper part of the iron core 1 to prevent the iron core from moving upwardly during the next stop. When the lower surface 5a of the pressing piece 5 is pushed by the operating rod 9 from the lower part of the upper tool 10, the pressing piece 5 is raised to insert each coil 16 into a corresponding stator slot 17 with the aid of the blades 3. At the same time, each wedge is inserted into a corresponding stator of the slots 17 to prevent the coils 16 from sliding out of the slots 17 and to provide insulation of the slots. When the pressing piece 5 reaches its uppermost position, pressing force to the pressing piece 5 is removed, the operating rod 9 is drawn, and the pressing piece 5 is returned to the original position together with its blades 3 formed integrally with the pressing piece.

In the conventional coil inserter having the upper tool constructed as above-mentioned, the coils 6 are inserted into the stator slots 17 while clamped by the blades 3. Even though the conventional system does not cause damage to the coils 16, the coils which have just been inserted are sometimes dragged out from the stator slots 17 when the pressing piece 5 and the blades 3 are retracted all together after insertion of the coils. Further, withdrawal of the pressing piece 5 and the blades 3 sometimes causes withdrawal of not only the coils 16, but also the wedges unless the lower parts of the coils 16 are pressed by hands or by pressing jig after the completion of the insertion of the coils. In the worst case, the insulating paper 2 may be broken.

OBJECT OF THE INVENTION

It is an object of the present invention to overcome the disadvantage of the conventional apparatus and to provide a method of inserting coils into stator iron core slots and an apparatus for carrying out the method which permits insertion of coils in a stable manner and provides correct positional relationship of the coils in the iron core slots.

SUMMARY OF THE INVENTION

The foregoing and the other objects of the present invention have been attained by providing a method of inserting coils into the slots of a stator iron core by moving a pressing piece and a blade supporter which are formed as separate bodies. The method comprises a step of holding the coils by first blades fixed to the pressing piece and second blades fixed to the blade supporter. The pressing piece and the blade supporter are then moved forward together to insert the coils into the slots of the iron core by means of the first and second blades. Next, the blade supporter only is moved backward for a predetermined distance, after which the pressing piece is moved backward together with the blade supporter. Thus, the second blades are retracted first while keeping the first blades momentarily in position.

BRIEF DESCRIPTION OF THE DRAWINGS

The foregoing objects, other objects, and specific embodiments of the invention will become apparent and understandable from the following detailed description thereof, when read in conjunction with the accompanying drawings.

In the drawings:

FIGS. 4 to 6 are respectively front views partly in cross-section of the first embodiment of the upper tool of the present invention showing the operations sequentially.

FIGS. 7 to 10 show a second embodiment of the upper tool of the present invention.

DETAILED DESCRIPTION OF THE FIRST PRESENTLY PREFERRED EMBODIMENT

A first embodiment of the present invention will be described with reference to FIGS. 3–6. In FIGS. 3 to 6, first blades 3 are firmly attached to corresponding outer peripheral grooves 22a of the pressing piece 22 by small screws 7a; and second blades 21 are firmly attached by small screws 7 to respective outer peripheral grooves 27a of a blade supporter 27 which is provided below the pressing piece 22.

Figure 3:
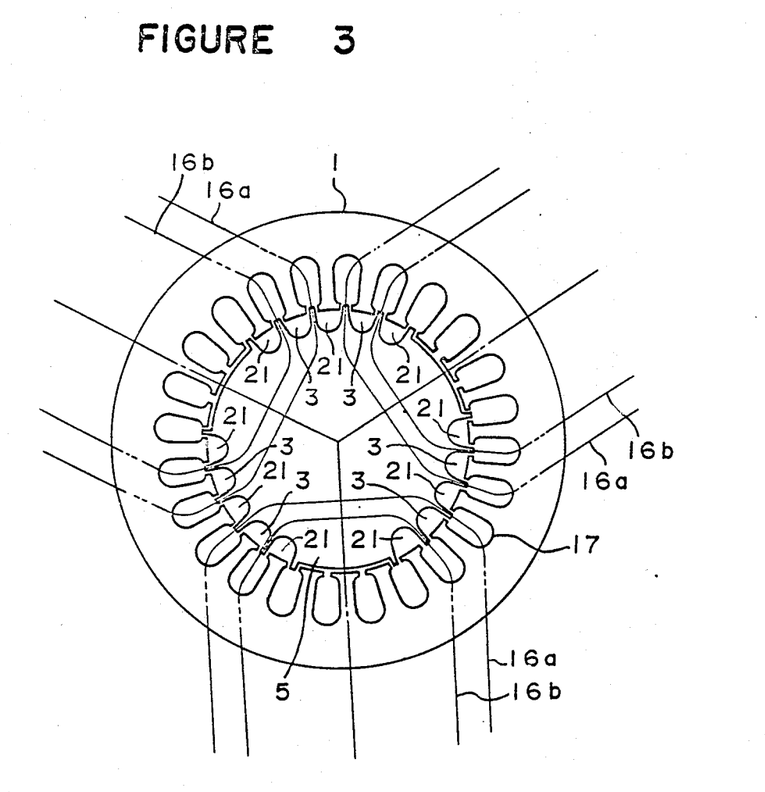
FIG. 3 is a plan view of a first embodiment of the upper tool of the coil inserter according to the present invention.

Arrangement of the blades 3 and 21 is such that, as shown in FIG. 3, they are placed alternately. In other words, each of the blades 3 is placed between two blades 21. In FIG. 3, each of the large coils 16a is supported by two second blades 21 at its outer side and by two first blades 3 at its inner side so as to be introduced into the inlet of the corresponding iron core slot 17. On the other hand, each of the small coils 16b is supported by two first blades 3 at its outer side and by two second blades 21 at its inner side.

A first ball plunger 30 is fitted into the central part of the pressing piece 22, and a second ball plunger 30a is fitted into the central part of the blade supporter 27. The ball plunger 30 will be described. An inner cylinder 23 is fastened to the pressing piece 22 by means of a threaded portion 23a formed at its one end. The inner cylinder 23 is provided with a plurality of ball receiving holes at the middle part and has an outer peripheral portion surrounded by an outer cylinder 25 to retain balls 24. The ball plunger 30 is constructed such that when the lower part of the outer cylinder 25 is detached from the blade supporter 27 by pulling the operating rod 28, the outer cylinder 25 is urged downward by a distance of stroke h by means of spring 26. Accordingly, a reduced diameter portion formed at the upper end part of the outer cylinder 25 urges the balls inwardly into the ball receiving holes in the inner cylinder 23, forcing them into engagement with the outer diameter portion in the second groove 28e of the operating rod. By lowering the enlarged part 28f of the operating rod 28, the pressing piece 22 is also lowered because the balls 24 are engaged with the enlarged part 28f.

When the blade supporter 27 and the pressing piece 22 are to be forwarded or raised toward the inner diameter of the stator iron core 1, the raising operation is carried out by pushing the lower part of the inner cylinder 23 of the ball plunger 30a in the blade supporter 27 by the stepped portion 28b of a large diameter part 28a of the operating rod 28. A first groove 28c is formed between an intermediate large diameter part 28d and the stepped portion 28b of the operating rod 28. The first groove 28c is engaged with the balls 24 of the ball plunger 30 for the blade supporter 27 to perform lowering or retracting of the blade supporter 27.

The operation of inserting coils will be explained.

Figure 4:
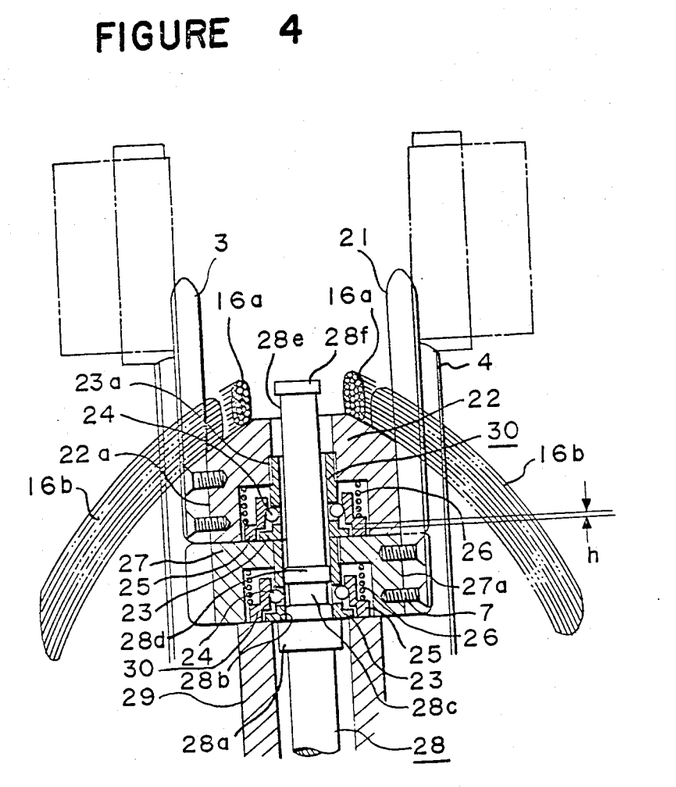
FIG. 4 shows a state before insertion of the coils.
Figure 5:
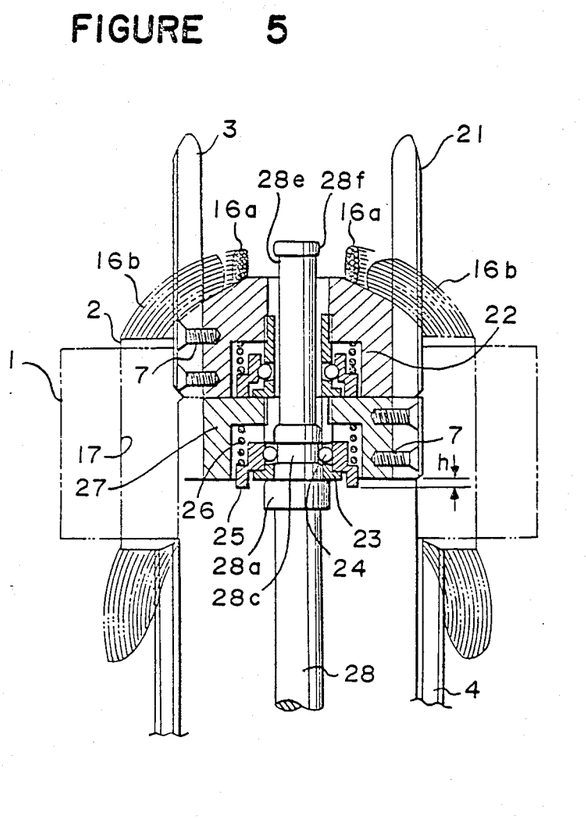
FIG. 5 shows a state in which the coils have just been inserted.

First of all, as shown in FIG. 3, the large coils 16a and the small coils 16b are set between adjacent paired first blades 3 and the second blades 21 in a predetermined insertion pattern. Then the stator iron core 1 is brought to the upper tool 10 so that the inner diameter of the iron core 1 is fitted to the outer peripheries of the first and second blades 3, 21 and comes to in contact with the top ends of the wedge guides 4. A stopper (not shown) is fitted to the outer periphery of the upper part of the stator iron core 1 to prevent its comming up. In this state, when a suitable force is applied to the lower part of the operating rod 28, the stepped portion 28b of the large diameter part 28a of the operating rod 28 is brought to contact with the lower surface of the inner cylinder 23 of the ball plunger 30a for the blade supporter 27 as shown in FIG. 4. Next, the operating rod 28 moves forward in the inner diameter part of the stator iron core 1, while maintaining the connection of the pressing piece 22 to the blade supporter 27 whereby the large coils 16a and the small coils 16b, each of which is held by the adjacent first blades 3 and the second blades 21 are inserted into predetermined iron core slots 17 (FIG. 5).

At this moment, the outer cylinder 25 of the ball plunger 30a for the blade supporter 27 projects by a distance of stroke h by the action of the spring 26 because the outer cylinder 25 becomes free from the supporting member 29. Accordingly, the balls 24 held in the ball plunger 30a for the blade supporter 27 come to engagement with the first groove 28c of the operating rod 28.

Figure 6:
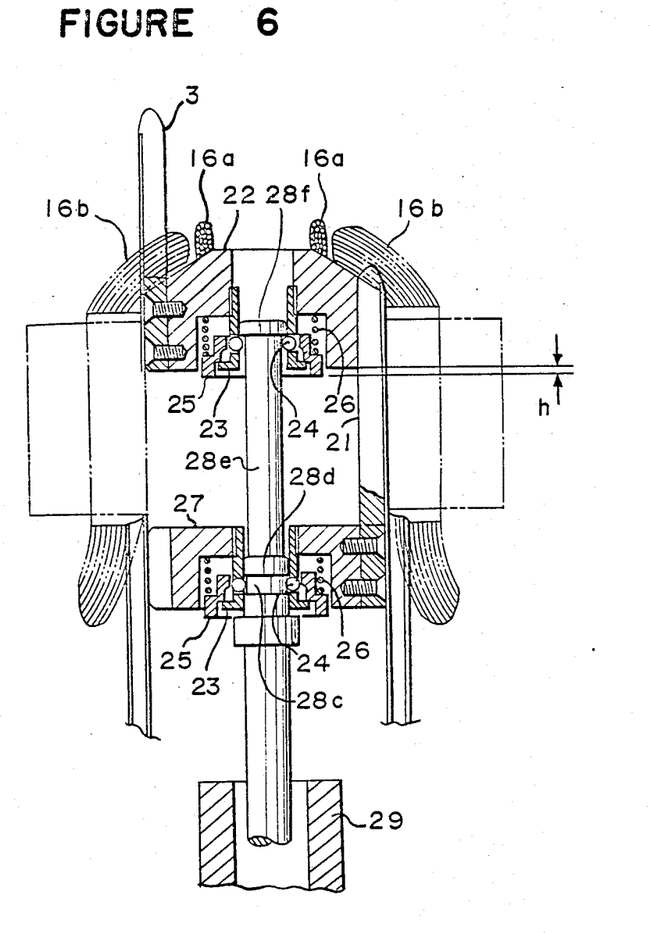
FIG. 6 shows the blades in a retracted position.

When a suitable pulling force is applied to the lower part of the operating rod 28, the balls 24 are forced down by the intermediate large diameter part 28d. As a result, the blade supporter 27 holding the second blades 21 is separated from the lower surface of the pressing piece 22 to move backward. At this time, the outer cylinder 25 of the ball plunger 30 for the pressing piece 22 projects by a distance of stroke h by the action of the spring 26. This is because the pressing piece 22 is caused to remain at its uppermost position due to the frictional force of the blades 3 against the coils 16a, 16b, accordingly, the balls 24 are urged inwardly from the inner cylinder 23 to come into engagement with the second groove 28c, and the operating rod 28 moves backward to cause the enlarged part 28f to engage with the balls (FIG. 6). Since the large coils 16a and the small coils 16b are released from the second blades 21 in the state as shown in FIG. 6, there is no risk of disturbance of the coils inserted and in the stator slots 17. Further, since the operating rod 28 continues to move backward, the pressing piece 22 retracts together with the first blades 3. Additionally, the blade supporter 27 also moves backward whereby the outer cylinder 25 comes to in contact with the supporting member 29, which prevents further downward movement of the outer cylinder 25, compressing the spring 26. As a result, restriction to the balls 24 in the radial direction is released, and the intermediate large diameter part 28d allows passage of the balls 24.

When the operating rod 28 further continues to move backward, the pressing piece 22 comes to in contact with the upper surface of the blade supporter 27 which is in contact with the supporting member 29. At this moment, the outer cylinder 25 of the ball plunger 30 for the pressing piece 22 moves upward against the action of the spring 26 to release the balls 24 in the radial direction, accordingly, the balls 24 become free from the engagement with the enlarged part 28f thereby moving backward to a predetermined lowermost position.

In the embodiment described above, explanation has been made as to a stator for three phase, four poles having two stage of coils wherein 24 slots and 120° coil pitch are formed. However, the coil inserter of the present invention is applicable to any option such as number of slots, coil pitch, number of coil stages, numbers of phases and poles, etc.

As described above, the coil inserter of first embodiment of the present invention comprises first blades formed integrally with a pressing piece and second blades formed integrally with a blade supporter provided below the pressing piece, both the blades being associated to support coils. Both groups of the blades move in the same manner when the coils are inserted. After insertion, the blade supporter and the second blades are firstly moved backward while the pressing piece and the first blades are left in position for a short period of time. With this construction, the coils can be inserted in a stable manner, and it is unnecessary to adjust the position of coils and wedges which have been partly dragged out from the slots or to press the coils to prevent this from happening as in the conventional apparatus.

DETAILED DESCRIPTION OF THE SECOND PRESENTLY PREFERRED EMBODIMENT

A second embodiment of the present invention will be described with reference to FIGS. 7 to 10. The same reference numerals designate the same or corresponding parts in this embodiment, and therefore the explanation of such parts is omitted.

Figure 10:
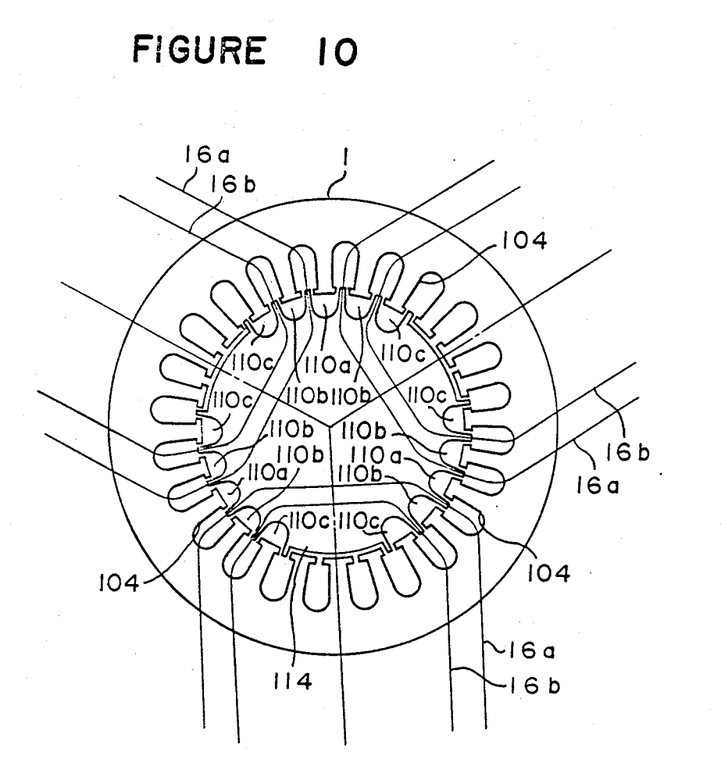
FIG. 10 is a plan view of the upper tool.

FIG. 10 shows a stator to be fabricated by the coil inserter according to the present invention. 24 slots 104 are formed in the inner peripheral surface of the stator iron core 1, and large coils 16a and small coils 16b each having a coil pitch of 120° are inserted in the iron core slots 104, thus constituting a three-phase four pole stator. Each of the large coils 16a is supported by neighboring paired blades 110a, 110b to be inserted into corresponding iron core slots 104, and each of small coils 16b is supported by neighboring paired blades 110b, 110c to be inserted into corresponding iron core slots 104.

Figure 7:
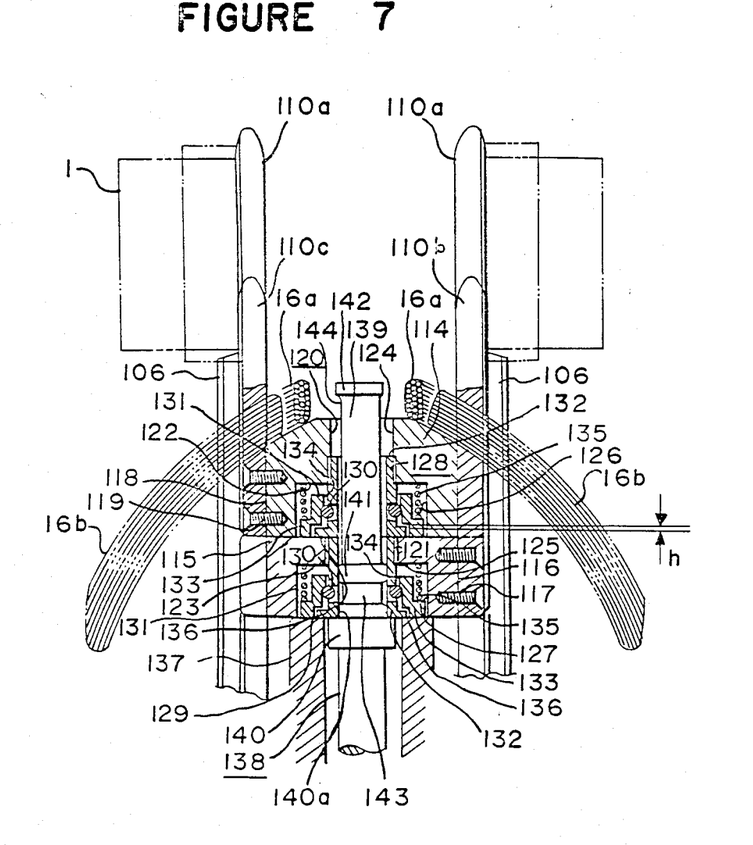
FIG. 7 is a front view, partly in cross-section, showing the coils about to be inserted into the iron core slots.
Figure 8:
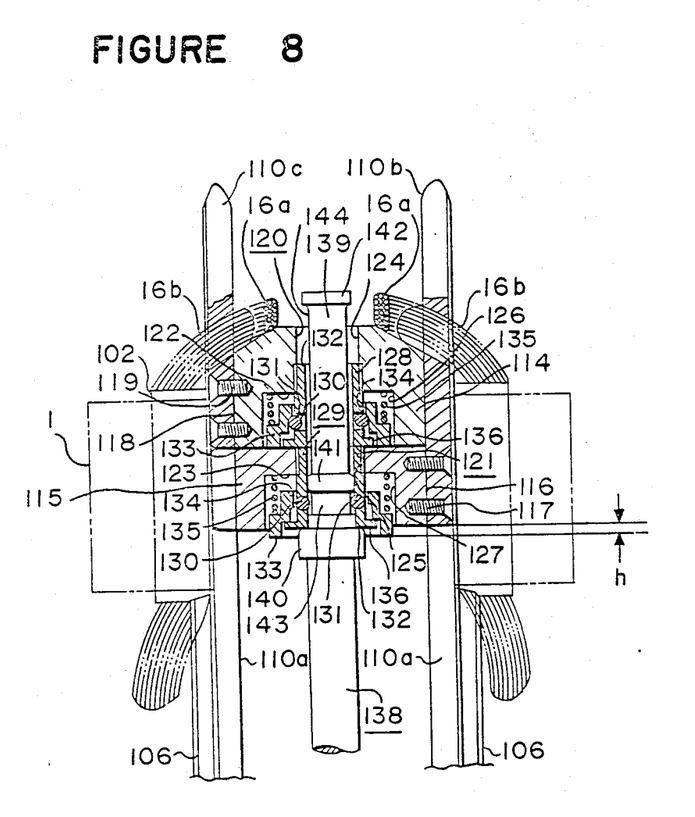
FIG. 8 shows the coils just after they have inserted into the slots.
Figure 9:
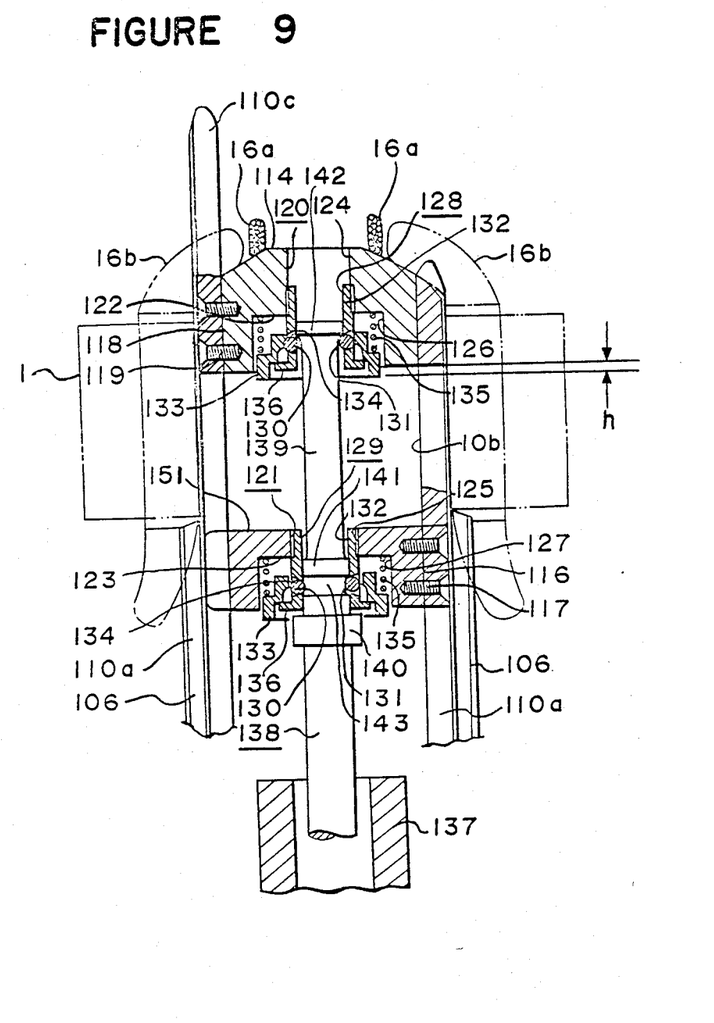
FIG. 9 shows a group of blades in their retracted position.

As shown in FIGS. 7 to 9, each of the blades 110a is in contact at its outer side with a corresponding wedge guide 106 installed on an upper tool (not shown) and is in a firmly secured condition on a blade holder (not shown). Each of the blades 110b is fixed by screws 117 to a corresponding outer peripheral groove 116 of a blade supporter 115 positioned below a pressing piece 114 which will be described hereinunder. Each of the blades 110c is fixed by screws 119 to a corresponding outer peripheral groove 118 of the pressing piece 114.

Vertical through holes 120, 121 are respectively formed each central portion of the pressing piece 114 and the blade supporter 115. Each of the through holes 120, 121 is made up by an upper small diameter part 124 or 125, a lower large diameter part 126 or 127 and an intermediate stepped part 122 or 123. The through holes 120, 121 respectively house ball plungers 128, 129 therein. The ball plunger 128 for the pressing piece 114 is provided with an inner cylinder 132 in which there are provided a plurality of ball receiving holes 130, 130 . . . in the radial direction, each of which receives a ball 131 and an outer cylinder 133 surrounding the outer side of the inner cylinder 132. The ball plunger 128 is constructed such that, when the upper end 134 of the outer cylinder 133 comes in contact with balls 131, each of balls 131 inwardly projects from the inner cylinder 32 through the ball receiving hole 130 and the outer cylinder 133 is downwardly urged by a coil spring 135. The urging force of the spring 135 causes relative downward movement of the outer cylinder 133 with respect to the inner cylinder 132. When the movement of the outer cylinder 133 is stopped by a stopper 136, the upper end 134 of the outer cylinder 133 is brought into contact with the balls 131. When the blade supporter 115 is in contact with the lower surface of the pressing piece 114, the lower surface of the outer cylinder 133 is in contact with the upper surface of the blade supporter 115. This contact compresses the spring 135, thereby preventing balls 131 from projecting inwardly through the inner cylinder 132.

The ball plunger 129 housed in the blade supporter 115 has the same construction as the ball plunger 128 in the pressing piece 114, provided that the upper end of the inner cylinder 132 of the ball plunger 129 is adapted to come into contact with the lower end of the inner cylinder 132 of the ball plunger 128. Further, the lower surface of the blade supporter 115, when it is at its lowermost position, is in contact with a supporting member 137 provided on the upper tool (not shown) accordingly, the outer cylinder 133 of the ball plunger 129 for the blade supporter 115 is retracted in the ball plunger 129 against the spring 135. An upper small diameter part 139 of an operating rod 138 is loosely fitted to the through hole 120 of the pressing piece 114 and the through hole 121 of the blade supporter 115. A stepped portion 140a formed at the large diameter part 140 of the operating rod 138 is adapted to come into contact with the lower end of the inner cylinder 132 of the ball plunger 129. At the lower end and the upper end of the small diameter part 139 of the operating rod 138, enlarged portions 141, 142 are formed respectively. The lower stepped portion 143 of the enlarged part 141 or the lower stepped portion 144 of the enlarged part 142 prevents the balls 131 from comming off from the enlarged part 141 or 142 when the balls are brought into contact therewith.

The second operation of the embodiment of the present invention will now be described.

As shown in FIG. 10, large coils 16a and small coils 16b are respectively set between neighboring paired blades 110a, 110b and 110b, 110c. Next, a stator iron core 1 is put onto the outer peripheries of the blades 110a, 110b, 110c so as to be in contact with the top end of the wedge guides 106 (FIG. 7). Then, a stopper (not shown) is fitted to the outer periphery of the upper part of the iron core 1 to prevent it from comming up. When the operating rod is urged upwardly, the stepped portion 140a of the large diameter part 140 of the operating rod 138 is brought into contact with the lower surface of the inner cylinder 132 of the ball plunger 129 for the blade supporter 115. Next, the operating rod 138, the blade supporter 115, and the pressing piece 114 move upwardly together in the opening of the stator iron core 1 together with the blades 110b, 110c attached thereto along the fixed blades 110a and the wedge guides 106 as guiding means. Accordingly, the large coils 16a held by the paired blades 110a, 110b and the small coils 16b held by the paired blades 110b, 110c are inserted into predetermined iron core slots 104 as shown in FIG. 8.

When the blade supporter 115 is raised and its lower surface is separated from the supporting member 137, the outer cylinder 133 (which has been retracted by the supporting member 137) projects by the action of the spring 135 by a distance equal to the stroke h. The projection of the outer cylinder 133 is limited by content between the outer cylinder 133, and the stopper 136 of the inner cylinder 132. Accordingly, the balls 131 in the ball plunger 129 for the blade supporter 115 are urged by the upper end 134 of the outer cylinder 133 to be engaged with the lower stepped portion 143. At the raised state of the pressing piece 114 and the blade supporter 115, when the operating rod 138 is downwardly pulled as shown in FIG. 9, the blade supporter 115 attached with the blades 110c is lowered apart from the lower surface of the pressing piece 114 because the enlarged portion 141 of the operating rod 138 urges the balls 131 downwardly. Hence the inner cylinder 132 connected to the blade supporter 115 also moves downwardly. At this moment, the outer cylinder 133 of the ball plunger 128 for the pressing piece 114 projects by the action of the spring 135 by the distance of the stroke h. On account of this, the balls are urged by the upper end of the outer cylinder 133 to partly project inwardly from the ball receiving holes of the inner cylinder 132 so as to be engage with the lower stepped portion 144 of the operating rod 138. Accordingly, as the operating rod 138 moves downwardly, the balls 131 engage the enlarged portion 142 (FIG. 9). In this case, the blades 110b (which are lowered together with the blade supporter 115) release the large coils 16a and the small coils 16b from their clamped condition. Accordingly, the release causes no disturbance and no inadvertent withdrawal of the coils 16a, 16b from the iron core slots 104.

When the operating rod 138 is further lowered, the pressing piece 114 with the blades 110c and the blade supporter 115 are also lowered. Finally, the outer cylinder 133 of the ball plunger 129 is brought into contact with the supporting member 137. As a result, the outer cylinder 133 is urged upwardly against the spring 135, and the balls 131 are released in the radial direction. Accordingly, the enlarged part 141 of the operating rod 138 passes through the circularly arranged balls 131. When the operating rod 138 continues to move downwardly, the pressing piece 114 is brought into contact with the upper surface of the blade supporter 115. That surface is in contact with the supporting member 137 and the outer cylinder 133 of the ball plunger 128 for the pressing piece 114 is retracted against the spring 135 to release the balls 124 in the radial direction in the same way that the balls 131 for the blade supporter 115, were released. Accordingly, the enlarged part 142 passes through the circularly arranged balls 131 to reach a predetermined lower position.

In accordance with the second embodiment of the present invention, simple forward and backward movement of the operating rod 138 causes sequential backward movement of the blades 110b and 110c. Moreover, it is possible to combine the coil inserter of the present invention with the conventional apparatus. Further, since the fixed blades 110a are used in the above-mentioned embodiment, reliable and stable positional relationship of the coils to the iron core 1 can be obtained to thereby prolong machine life.

In the second embodiment described above, explanation has been made as to a stator for three phase, four poles having two stages of coil wherein 24 slots and 120° coil pitch are formed. However, the coil inserter of the present invention is applicable to any option such as number of slots, coil pitch, number of coil stages, numbers of phase and poles as well as arrangement of the movable blades and the fixed blades.

As a modification of the coil inserter shown in FIG. 10, it is possible to make the blades 110c to be fixed blades 110a and the fixed blades 110a to be the movable blade 110c so that small coils 16b are removed from the top end of the fixed blades 110a at the same time of insertion. This gives the advantage of shortening the average length of the coils.

As described above, the coil inserter of the second embodiment of the present invention comprises a pressing piece comming to and going away from a stator iron core and a blade supporter which moves in synchronism with the pressing piece at the time of approaching to the stator iron core and is separated from the same prior to the pressing piece at the time of going. The pressing piece and the blade supporter are respectively provided with a plurality of blades to holding coils to thereby release the coils clamped by the blades in the intermediate state of operation. With this construction, the coils can be inserted in a stable manner, and it is unnecessary to adjust the position of the coils and wedges pulled out from the slots or to press the coils to prevent them from coming off as in the conventional apparatus. The coil inserter of the present invention is stable in operation and is applicable to an automation line.

I claim:

1. A coil inserter for inserting coils into the slots of a stator core, said coil inserter comprising:
   (a) a pressing piece having a forward surface on which coils are disposed during use of the coil inserter, a rearward surface, and an axial through hole, said pressing piece being sized and shaped to slide axially into a stator core during use of the coil inserter;
   (b) a blade supporter having a forward surface which faces the rearward surface of said pressing piece, a rearward surface, and an axial through hole which communicates with the axial through hole in said pressing piece, said blade supporter being sized and shaped to slide axially into a stator core during use of the coil inserter;
   (c) a supporting member having a forward surface which faces the rearward surface of said blade supporter;
   (d) a plurality of symmetrically arranged, axially extending first blades attached to the outer periphery of said pressing piece and extending forwardly therefrom;
   (e) a plurality of symmetrically arranged, axially extending second blades attached to the outer periphery of said blade supporter and extending forwardly therefrom;

(f) said first and second blades having axial lengths such that, when the forward surface of said blade supporter abuts the rearward surface of said pressing piece, said first and second blades lie alongside each other forwardly of said pressing piece;

(g) said first and second blades alternating with one another around the periphery of said pressing piece and being spaced from one another to hold coils therebetween during use of the coil inserter;

(h) a first ball plunger fitted in the axial through hole in said pressing piece, said first ball plunger comprising an inner cylinder which is fastened to said pressing piece and which has a rearward surface which is co-planar with the rearward surface of said pressing piece, an outer cylinder which is axially movable relative to said inner cylinder and which has an inner, axially symmetric cam surface, a plurality of balls received in ball receiving holes in said inner cylinder in position to be cammed inwardly by rearward movement of the cam surface on said outer cylinder relative to said inner cylinder, and a spring which biases said outer cylinder rearwardly, said outer cylinder being axially movable between a first position in which its rearward surface is co-planar with the rearward surface of said pressing piece and abuts the forward surface of said blade supporter and a second position in which its rearward surface projects rearwardly from the rearward surface of said pressing piece by a stroke distance h, said inner and outer cylinders being interconnected to prevent said outer cylinder from projecting rearwardly from the rearward surface of said pressing piece by more than the stroke distance h;

(i) a second ball plunger fitted in the axial through hole in said blade supporter, said second ball plunger comprising an inner cylinder which is fastened to said blade supporter and which has a rearward surface which is co-planar with the rearward surface of said blade supporter, an outer cylinder which is axially movable relative to said inner cylinder and which has an inner, axially symmetric cam surface, a plurality of balls received in ball receiving holes in said inner cylinder in position to be cammed inwardly by rearward movement of the cam surface on said outer cylinder relative to said inner cylinder, and a spring which biases said outer cylinder rearwardly, said outer cylinder being axially movable between a first position in which its rearward surface is co-planar with the rearward surface of said blade supporter and abuts the forward surface of said supporting member and a second position in which its rearward surface projects rearwardly from the rearward surface of said pressing piece by the stroke distance h, said inner and outer cylinders being interconnected to prevent said outer cylinder from projecting rearwardly from the rearward surface of said blade supporter by more than the stroke distance h; and (j) an operating rod which extends forwardly from said supporting member and is axially movable relative thereto, said operating rod extending through said inner cylinders of said first and second ball plungers and having a first enlarged collar at its forward end sized and positioned to abut against the balls in said first ball plunger when said balls have been cammed inwardly by rearward movement of said outer cylinder of said first ball plunger, a second enlarged collar spaced rearwardly from said first enlarged collar sized and positioned to abut against the balls in said second ball plunger when said balls have been cammed inwardly by rearward movement of said outer cylinder of said second ball receiving plunger, and a third enlarged collar spaced rearwardly from said second enlarged collar sized and positioned to abut against said inner cylinder of said second ball plunger to transmit forward motion of said operating rod to said blade supporter, whereby, during use of the coil inserter, (k) each coil is initially held by two pairs of blades, each pair of blades consisting of one of said first blades and one of said second blades;

(l) said pressing piece and said blade supporter are then moved forwardly together by forward motion of said operating rod with the forward surface of said blade supporter in abutment with the rearward surface of said pressing piece to insert the coils into the slots of a stator core;

(m) said blade supporter is then moved rearwardly by rearward motion of said operating rod, disengaging said second blades from the coils while said pressing piece and said first blades remain in position;

(n) said pressing piece is then moved rearwardly, disengaging said first blades from the coils; and (o) steps (l), (m), and (n) are all accomplished by a single extension and retraction of said operating rod.

2. A coil inserter as recited in claim 1 wherein, when the forward surface of said supporting member abuts the rearward surface of said blade supporter and the forward surface of said blade supporter abuts the rearward surface of said pressing piece:

(a) the rearward surface of said first enlarged collar is forward of the balls in said first ball plunger by a first distance;

(b) the rearward surface of said second enlarged collar is forward of the balls in said second ball plunger by a second distance which is less than said first distance; and (c) the forward surface of said third enlarged collar abuts the rearward surface of said inner cylinder of said second ball plunger.

3. A coil inserter as recited in claim 1 wherein said first and second blades have axial lengths such that, when the forward surface of said blade supporter abuts the rearward surface of said pressing piece, the forward ends of said first and second blades are at least approximately coplanar.

* * * * *